(12) United States Patent
Akiyama (10) Patent No.: US 11,441,971 B2
(45) Date of Patent: Sep. 13, 2022

(54) TESTING SYSTEM

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/619,932

(22) PCT Filed: Mar. 18, 2020

(86) PCT No.: PCT/JP2020/011938
§ 371 (c)(1),
(2) Date: Dec. 16, 2021

(87) PCT Pub. No.: WO2020/255505
PCT Pub. Date: Dec. 24, 2020

(65) Prior Publication Data
US 2022/0205869 A1 Jun. 30, 2022

(30) Foreign Application Priority Data
Jun. 19, 2019 (JP) .............................. JP2019-113516

(51) Int. Cl.
*G01M 13/025* (2019.01)
*G01P 3/00* (2006.01)
(Continued)

(52) U.S. Cl.
CPC ............. *G01M 13/025* (2013.01); *G01L 3/02* (2013.01); *G01M 15/02* (2013.01); *G01P 3/00* (2013.01)

(58) Field of Classification Search
CPC ....... G01M 13/025; G01M 15/02; G01L 3/02; G01P 3/00
See application file for complete search history.

(56) References Cited

U.S. PATENT DOCUMENTS 9,116,062 B2 * 8/2015 Akiyama ............ G01M 13/025
9,234,820 B2 * 1/2016 Akiyama ............ G01M 13/025
(Continued)

FOREIGN PATENT DOCUMENTS

JP S59-188534 A 10/1984
JP 2013-101048 A 5/2013
(Continued)

OTHER PUBLICATIONS

Akiyama, Takao et al., "Engine Load Torque Control of Engine Test Bench by PID Controller", IEEJ Transactions, vol. 136, No. 5, pp. 659-667.

*Primary Examiner* — Freddie Kirkland, III
(74) *Attorney, Agent, or Firm* — Muncy, Geissler, Olds & Lowe, P.C.

(57) ABSTRACT

This testing system is provided with: an input side control device 5 for controlling an input side dynamometer to eliminate a deviation between a speed command signal w1ref and a speed detected signal w1; and an output side control device 6 for controlling output side dynamometer to eliminate a deviation between a torque command signal Tk1 ref and a torque detected signal Tk1. A control gain of the control device 5 is set such that the real part of a pole of a transfer function (w1/w1 ref) becomes greater toward the negative side than a value obtained by multiplying a resonant frequency by the negative sign, and a control gain of the control device 6 is set such that the real part of a pole of a transfer function (Tk1/Tk1 ref) becomes smaller toward the negative side than the real part of the pole of speed control system closed loop transfer function.

8 Claims, 7 Drawing Sheets

(51) Int. Cl.
  *G01L 3/02*     (2006.01)
  *G01M 15/02*    (2006.01)

(56)     References Cited

U.S. PATENT DOCUMENTS

| | | | |
|---|---|---|---|
| 9,632,007 B2* | 4/2017 | Bauer | G01M 13/025 |
| 10,895,511 B2* | 1/2021 | Yamaguchi | G01M 17/007 |
| 11,105,701 B2* | 8/2021 | Akiyama | G01M 13/025 |
| 11,204,302 B2* | 12/2021 | Yamaguchi | G01M 13/025 |
| 11,313,762 B2* | 4/2022 | Akiyama | G01L 25/003 |
| 2015/0107347 A1 | 4/2015 | Bauer et al. | |
| 2015/0142341 A1 | 5/2015 | Akiyama et al. | |
| 2015/0219529 A1 | 8/2015 | Akiyama et al. | |
| 2020/0103296 A1 | 4/2020 | Yamaguchi et al. | |

FOREIGN PATENT DOCUMENTS

| | | |
|---|---|---|
| JP | 2013-257234 | 12/2013 |
| JP | 2018-179802 A | 11/2018 |
| WO | WO2014/010409 | 1/2014 |

\* cited by examiner

TESTING SYSTEM

TECHNICAL FIELD

The present invention relates to a testing system. More particularly, the present invention relates to a testing system including a dynamometer coupled to an input shaft and an output shaft of a test piece, each of which may vary in resonant frequency, such as the drivetrain of a vehicle.

BACKGROUND ART

Drivetrain refers to a generic term for a plurality of devices for transferring the energy generated by an engine to drive wheels. The drivetrain includes, for example, an engine, a clutch, a transmission, drive shafts, a propeller shaft, differential gears, and drive wheels. A testing system for the drivetrain actually causes an engine to drive a transmission to perform electric inertia control of an output-side dynamometer connected to the output shaft of the drivetrain, thereby evaluating the durability, quality, or other properties of the drivetrain while applying a loading torque, which simulates the inertia of tires or a vehicle body, to the output shaft (for example, refer to Patent Document 1). In addition, a testing system has been proposed in recent years which generates a drive torque, which is inputted to an input shaft of the drivetrain, with an input-side dynamometer instead of an actual engine (for example, refer to Patent Document 2).

Patent Document 1: PCT International Publication No. WO2014/010409

Patent Document 2: Japanese Unexamined Patent Application, Publication No. 2013-257234

DISCLOSURE OF THE INVENTION

Problems to be Solved by the Invention

Here, for example, a case is considered in which dynamometers are respectively connected to the input shaft and the output shaft of the drivetrain, which is a test piece, and the input shaft and the output shaft are subjected to both speed control and torque control by using these dynamometers. In the testing system of the drivetrain, the resonant frequency changes between the lowest and highest frequencies by changing the transmission gear ratio of the test piece installed between the input and output shafts. In order to cope with such a change in the resonant frequency, in the prior art, the speed control is performed under a control response lower than the lowest frequency for the input shaft side, and the torque control is performed which does not feedback the shaft torque for the output shaft side. However, in this case, the control response also changes with changes in the transmission gear ratio, as described later with reference to FIGS. 4 and 5.

It is an object of the present invention to provide a testing system that performs speed control for one of an input shaft and an output shaft of a test piece, and performs torque control for the other of the input shaft and the output shaft of the test piece, in which it is possible to perform the speed control and the torque control without greatly changing a control response even if a transmission gear ratio of the test piece changes.

Means for Solving the Problems (1) In a first aspect according to an exemplary embodiment of the present invention, a testing system (for example, a testing system to be described later) includes: dynamometers (for example, an input-side dynamometer 11 and an output-side dynamometer 12 to be described later) which are respectively coupled to an input shaft (for example, an input shaft WI to be described later) and an output shaft (for example, an output shaft WO to be described later) of a test piece (for example, a test piece W to be described later) which can change a transmission gear ratio (for example, a transmission gear ratio g to be described later) between input and output; a speed detector (for example, an input-side angular velocity sensor 31 to be described later) that generates a speed detection signal (for example, an input-side angular velocity detection signal w1 to be described later) corresponding to a shaft speed of either one of the input shaft and the output shaft (for example, an input shaft WI to be described later); a torque detector (for example, an output-side shaft torque sensor 42 to be described later) that generates a torque detection signal (for example, an output-side shaft torque detection signal Tk1 to be described later) corresponding to a shaft torque of one other of the input shaft and the output shaft (for example, an output shaft WO to be described later); a speed controller (for example, an input-side controller 5 to be described later) that controls the dynamometer (for example, an input-side dynamometer 1 to be described later) coupled to the one of the input shaft and the output shaft such that a deviation between a speed command signal (for example, an input-side angular velocity command signal w1ref to be described later) corresponding to a command for the speed, and the speed detection signal is eliminated; and a torque controller (for example, an output-side controller 6 to be described later) that controls the dynamometer (for example, an output-side dynamometer 12 to be described later) coupled to the other one of the input shaft and the output shaft such that a deviation between a torque command signal (for example, an output-side shaft torque command signal Tk1ref to be described later) corresponding to a command for the torque, and the torque detection signal is eliminated. A control gain of the speed controller (for example, a control gain (Kp1, Ki1) to be described later) is set such that a real part of a pole of a speed control system closed-loop transfer function from the speed command signal to the speed detection signal (for example, a pole Ps to be described later) becomes larger in a negative direction than a value obtained by multiplying a resonant frequency (for example, a resonant frequency wr to be described later) of a control target including the test piece by a negative sign, and a control gain of the torque controller (for example, a control gain (Kp2, Kd2, f2, Ki2) to be described later) is set such that a real part of a pole of a torque control system closed-loop transfer function from the torque command signal to the torque detection signal (for example, a pole Pt to be described later) becomes smaller in the negative direction than the real part of the pole of the speed control system closed-loop transfer function.

(2) In the first aspect, it is preferable that the control gain of the torque controller is set such that the real part of the pole of the torque control system closed-loop transfer function becomes smaller in the negative direction than the value obtained by multiplying the resonant frequency of the control target by a negative sign.

(3) In the first aspect, it is preferable that the resonant frequency of the control target varies between a lowest frequency (a lowest resonant frequency wr_min to be described later) and a highest frequency (for example, a highest resonant frequency wr_max to be described later) by the transmission gear ratio varying, the control gain of the speed controller is set such that the real part of the pole of the speed control system closed-loop transfer function becomes larger in the negative direction than a value obtained by multiplying the highest frequency by a negative sign, and the control gain of the torque controller is set such that the real part of the pole of the torque control system closed-loop transfer function becomes smaller in the negative direction than a value obtained by multiplying the lowest frequency by a negative sign.

(4) In the first aspect, it is preferable that the control gain of the speed controller is set such that an imaginary part of the pole of the speed control system closed-loop transfer function becomes zero, and the control gain of the torque controller is set such that an imaginary part of the pole of the torque control system closed-loop transfer function becomes zero.

Effects of the Invention (1) In the testing system according to the present invention, the speed controller controls the dynamometer coupled to either one of the input shaft and the output shaft of the test piece (hereinafter, also referred to as the "a speed control-side shaft") so that the deviation between the speed command signal and the speed detection signal is eliminated, and the torque controller controls the dynamometer coupled to the other one of the shafts (hereinafter, also referred to as the "a torque control-side shaft") so that the deviation between the torque command signal and the torque detection signal is eliminated. Furthermore, in the present invention, the control gain of the speed controller is set such that the real part of the pole of the speed control system closed-loop transfer function becomes larger in the negative direction than the value obtained by multiplying the resonant frequency of the control target including the dynamometer or the like coupled to the test piece and the input and output shafts, by a negative sign. In other words, the control gain of the speed controller is set such that the control response of the shaft on the speed control side becomes higher than the resonant frequency. Thus, it is possible to increase the apparent inertia of the shaft on the speed control side viewed from the shaft of the torque control side. Furthermore, in the present invention, the control gain of the torque controller is set such that the real part of the pole of the torque control system closed-loop transfer function becomes smaller in the negative direction than the real part of the pole of the speed control system closed-loop transfer function. In other words, the control gain of the torque controller is set such that the control response of the shaft on the torque control side becomes lower than the control response of the shaft on the speed control side. Thus, in the torque controller, it is possible to perform torque feedback control which is robust to changes in the resonant frequency of the control target. Thus, even when the resonant frequency changes with the change in the transmission gear ratio of the test piece, it is possible to perform the speed control and torque control of the input and output shafts without greatly changing the control response.

(2) In the testing system according to the present invention, the control gain of the torque controller is set such that the real part of the pole of the torque control system closed-loop transfer function becomes smaller in the negative direction than the value obtained by multiplying the resonant frequency of the control target by a negative sign. Thus, it is possible to further improve the robustness of the torque control by the torque controller, and hence, it is possible to further reduce or suppress a change in the control response with the change in the resonant frequency of the control target.

(3) In the testing system according to the present invention, the control gain of the speed controller is set such that the real part of the pole of the speed control system closed-loop transfer function becomes larger in the negative direction than the value obtained by multiplying the highest frequency of the resonant frequency by a negative sign. Thus, it is possible to further increase the apparent inertia of the shaft of the speed control side viewed from the shaft of the torque control side. Furthermore, in the present invention, the control gain of the torque controller is set such that the real part of the pole of the torque control system closed-loop transfer function becomes smaller in the negative direction than the value obtained by multiplying the lowest frequency of the resonant frequency by a negative sign. Thus, it is possible to further improve the robustness of the torque control by the torque controller, and hence, it is possible to further reduce or prevent a change in the control response with the change in the resonant frequency of the control target.

(4) As will be described later with reference to FIGS. 4 and 5, in the prior art, varying the speed command signal or the torque command signal may cause the speed detection signal or torque detection signal to exhibit oscillatory behavior. In contrast, in the testing system according to the exemplary embodiment of the present invention, the control gain of the speed controller is set such that the imaginary part of the pole of the speed control system closed-loop transfer function becomes 0, and the control gain of the torque controller is set such that the imaginary part of the pole of the torque control system closed-loop transfer function becomes 0. Thus, it is possible to reduce or prevent oscillatory behavior of the speed detection signal and the torque detection signal.

Preferred Mode for Carrying Out the Invention

Figure 1:
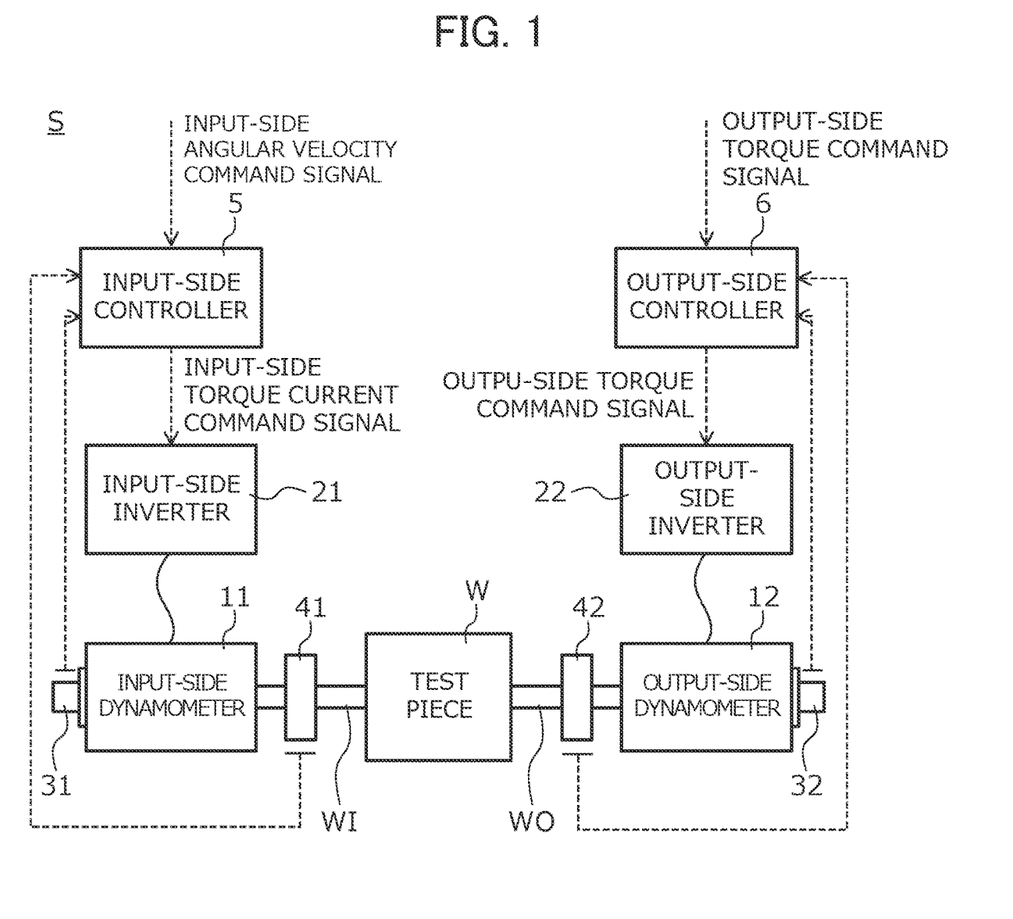
FIG. 1 is a diagram showing a configuration of a testing system according to an exemplary embodiment of the present invention.

An embodiment of the present invention will be described in detail below with reference to the drawings. FIG. 1 is a diagram showing a configuration of a testing system S according to an exemplary embodiment of the present invention. The testing system S evaluates the performance of a test piece W which can change transmission gear ratio between input and output. In the following, as the test piece W, a case of a drivetrain for a vehicle is described which includes an input shaft WI, an output shaft WO, and a transmission mechanism that shifts a drive force inputted to the input shaft WI under a set transmission gear ratio and transfers the resultant force to the output shaft WO. That is, the testing system S is referred to as a so-called drivetrain bench system for evaluating the performance of the drivetrain for a vehicle. Furthermore, in the following, a case of a two-axis drivetrain mounted to a so-called front-engine, rear-drive (FR) vehicle will be described the test piece W; however, the present invention is not limited thereto. More specifically, for example, a case of a three-axis drivetrain mounted to a so-called front-engine, front-drive (FF) vehicle including a single input shaft, two output shafts, and a transmission mechanism that shifts a drive force inputted to the input shaft under a set transmission gear ratio and transfers the resultant force to the two output shafts.

The testing system S includes the test piece W whose transmission gear ratio can be changed, an input-side dynamometer 11 which is coupled coaxially to the input shaft WI, an output-side dynamometer 12 which is connected coaxially to the output shaft WO, an input-side inverter 21 that supplies power to the input-side dynamometer 11 in response to an input-side torque current command signal, an output-side inverter 22 that supplies power to the output-side dynamometer 12 in response to the output-side torque current command signal, an input-side angular velocity sensor 31 that detects the angular velocity of the input shaft WI, an output-side angular velocity sensor 32 that detects the angular velocity of the output shaft WO, an input-side shaft torque sensor 41 that detects a shaft torque in the input shaft WI, an output-side shaft torque sensor 42 that detects a shaft torque in the output shaft WO, an input-side controller 5 that generates an input-side torque current command signal and inputs the signal to the input-side inverter 21, and an output-side controller 6 that generates an output-side torque current command signal and inputs the signal to the output-side inverter 22.

The input-side angular velocity sensor 31 generates an input-side angular velocity detection signal corresponding to the input-side angular velocity of the shaft of the input-side dynamometer 11 which rotates at approximately the same speed as the input shaft WI, and inputs the signal to the input-side controller 5. The output-side angular velocity sensor 32 generates an output-side angular velocity detection signal corresponding to the output-side angular velocity of the shaft of the output-side dynamometer 12 which rotates at substantially the same speed as the output shaft WO, and inputs the signal to the output-side controller 6.

The input-side shaft torque sensor 41 detects the input-side shaft torque acting on the input shaft WI from, for example, the amount of distortion in the torsional direction of the shaft, generates an input-side shaft torque detection signal corresponding to the input-side shaft torque, and inputs this to the input-side controller 5. The output-side shaft torque sensor 42 detects the output-side shaft torque acting on the output shaft WO from, for example, the amount of distortion in the torsional direction of the shaft, generates an output-side shaft torque detection signal corresponding to the output-side shaft torque, and inputs this to the output-side controller 6.

The input-side controller 5 generates an input-side torque current command signal based on a predetermined feedback control rule using the input-side angular velocity detection signal and the input-side shaft torque detection signal, and inputs the signal to the input-side inverter 21. More specifically, the input-side controller 5 has a speed control function. The speed control function generates an input-side torque current command signal based on the feedback control rule characterized by one or more control gains, and inputs the signal to the input-side inverter 21 such that the deviation between the input-side angular velocity command signal corresponding to a command for the input-side angular velocity of the input shaft WI and the input-side angular velocity detection signal is eliminated.

The output-side controller 6 generates an output-side torque current command signal based on a predetermined feedback control rule using the output-side angular velocity detection signal and the output-side shaft torque detection signal, and inputs the signal to the output-side inverter 22. More specifically, the output-side controller 6 has a shaft torque control function. The shaft torque control function generates an output-side torque current command signal based on the feedback control rule characterized by one or more control gains, and inputs the signal to the output-side inverter 22 such that the deviation between the output-side shaft torque command signal corresponding to a command for the output-side shaft torque of the output shaft WO and the output-side shaft torque detection signal is eliminated.

In the present exemplary embodiment as described above, a case in which the input-side controller 5 performs speed control on the input shaft WI and the output-side controller 6 performs shaft torque control on the output shaft WO will be described. However, the present invention is not limited thereto. For example, for the input shaft WI, the input-side controller 5 may perform shaft torque control that generates an input-side torque current command signal such that the deviation between the input-side shaft torque command signal and the input-side shaft torque detection signal is eliminated; whereas, for the output shaft WO, the output-side controller 6 may perform speed control that generates an output-side torque current command signal such that the deviation between the output-side angular velocity command signal and the output-side angular velocity detection signal is eliminated.

Figure 2:
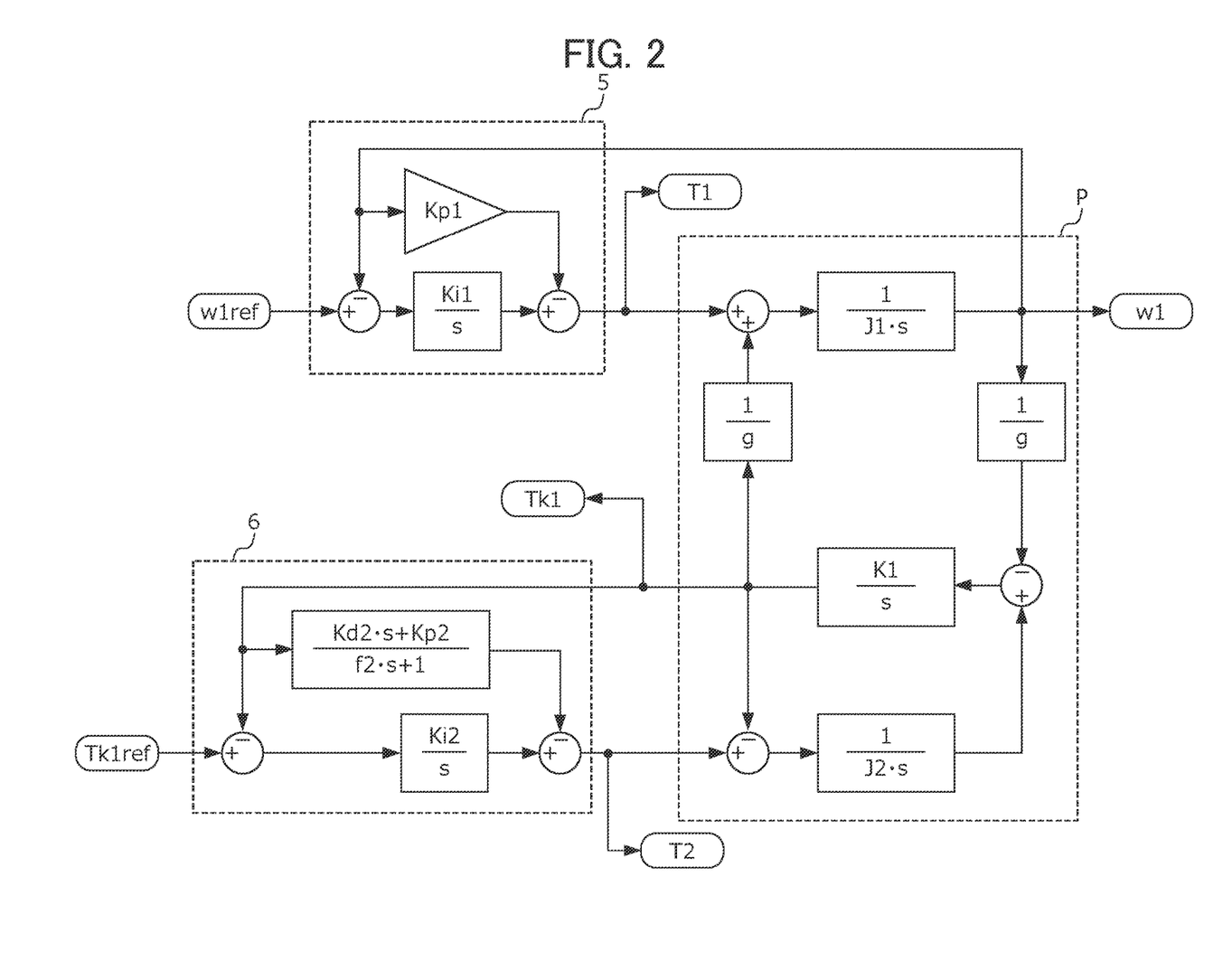
FIG. 2 is a block diagram showing a configuration of a control circuit of an input-side controller and an output-side controller.

FIG. 2 is a block diagram showing the configuration of a control circuit and a control target P of the input-side controller 5 and the output-side controller 6.

In FIG. 2, the symbol "s" refers to a Laplacian operator. Furthermore, the symbol "J1" refers to the moment of inertia of the input-side dynamometer 11, and the symbol "J2" refers to the moment of inertia of the output-side dynamometer 12, each of which is known. Furthermore, the symbol "g" refers to a transmission gear ratio of the test piece W. Furthermore, the symbol "K1" refers to the torsional rigidity of the output shaft WO of the test piece W, and is known. Furthermore, the symbol "T1" refers to the torque of the input-side dynamometer 11, and corresponds to the input-side torque current command signal generated by the input-side controller 5. The symbol "T2" refers to the torque of the output-side dynamometer 12, and corresponds to the output-side torque current command signal generated by the output-side controller 6.

Additionally, the symbol "w1" refers to the angular velocity of the input shaft WI of the test piece W, and corresponds to the input-side angular velocity detection signal detected by the input-side angular velocity sensor 31. Moreover, the symbol "Tk1" corresponds to the output-side shaft torque acting on the output shaft WO of the test piece W, and corresponds to the output-side shaft torque detection signal detected by the output-side shaft torque sensor 42. In addition, the symbol "w1ref" refers to a target for the input-side angular velocity detection signal w1, and corresponds to the input-side angular velocity command signal to be inputted to the input-side controller 5 for performing speed control.

Furthermore, the symbol "Tk1ref" refers to a target for the output-side shaft torque detection signal Tk1, and corresponds to the output-side shaft torque command signal to be inputted to the output-side controller 6 for performing shaft torque control.

In the control target P including the test piece W, the input-side dynamometer 11 connected to the input shaft WI, and the output-side dynamometer 12 connected to the output shaft WO as described above, the transmission gear ratio g of the test piece W may vary between the lowest transmission gear ratio g_min and the highest transmission gear ratio g_max. Therefore, the resonant frequency wr of the control target P may vary between the lowest resonant frequency wr_min (refer to the following expression (1-1)) and the highest resonant frequency wr_max (refer to the following expression (1-2)) by the transmission gear ratio g varying between the lowest transmission gear ratio g_min and the highest transmission gear ratio g_max.

$$\text{wr\_min} = \sqrt{K1\left(\frac{1}{J1 \cdot g\_max^2} + \frac{1}{J2}\right)} \quad (1\text{-}1)$$

$$\text{wr\_max} = \sqrt{K1\left(\frac{1}{J1 \cdot g\_min^2} + \frac{1}{J2}\right)} \quad (1\text{-}2)$$

As described above, in the present invention, a three-axis drivetrain having two output shafts may be used as a test piece. In this case, by treating the moment of inertia, torque, and torsional torque of the two output shafts as the total value, it is possible to configure a control circuit of the input-side controller and the output-side controller under basically the same two-axis transfer function model as in FIG. 2.

For example, as shown in FIG. 2, the input-side controller 5 generates an input-side torque current command signal T1 so that the deviation between the input-side angular velocity command signal w1ref and the input-side angular velocity detection signal w1 is eliminated, by the I-P control rule characterized by two control gains (Kp1, Ki1), and inputs the signal to the input-side inverter 21.

For example, as shown in FIG. 2, the output-side controller 6 generates an output-side torque current command signal T2 so that the deviation between the output-side shaft torque command signal Tk1ref and the output-side shaft torque detection signal Tk1 is eliminated, by the I-PD control rule characterized by four control gains (Kp2, Kd2, f2, Ki2), and inputs the signal to the output-side inverter 22.

Next, the setting of the control gain (Kp1, Ki1) of the input-side controller 5 will be described. First, when the control target P is defined as an inertial body of the moment of inertia J1, the expression of motion is approximately expressed by the following expression (2).

$$w1 = \frac{1}{J1 \cdot s} T1 \quad (2)$$

Furthermore, when the expression of motion of the control target P is approximated by the above expression (2), the speed control system closed-loop transfer function from the input-side angular velocity command signal w1ref to the input-side angular velocity detecting signal w1 is expressed by the following expression (3).

$$\frac{w1}{w1ref} = \frac{Ki1}{J1 \cdot s^2 + Kp1 \cdot s + Ki1} \quad (3)$$

Figure 3:
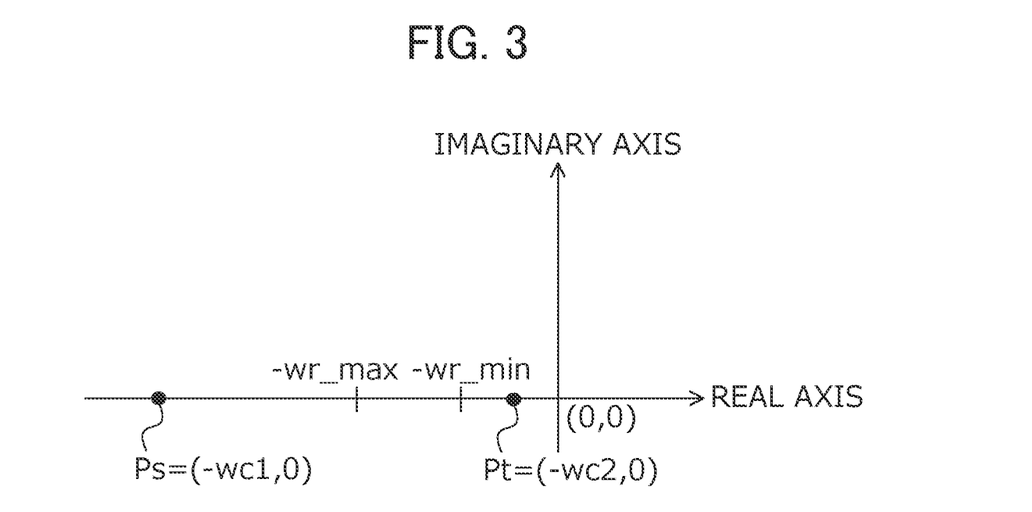
FIG. 3 is a diagram showing positions of the poles of a speed control system closed loop transfer function and a shaft torque control system closed loop transfer function.

FIG. 3 is a diagram showing the positions of a pole Ps of the speed control system closed-loop transfer function and a pole Pt of the shaft torque control system closed-loop transfer function described later. As shown in FIG. 3, the control gain (Kp1, Ki1) of the input-side controller 5 is set such that the imaginary part of the pole Ps of the speed control system closed-loop transfer function as shown in the above expression (3) becomes substantially zero, and the real part of the pole Ps becomes larger in the negative direction than the value obtained by multiplying the resonant frequency wr by a negative sign. More specifically, when the real part of the pole Ps of the speed control closed-loop transfer function is defined as −wc1, the real part −wc1 of the pole is set to become larger in the negative direction than the value obtained by multiplying the highest resonant frequency wr_max by a negative sign. In the following, as shown in the following expression (4), a case will be described in which the control gain (Kp1, Ki1) is set so that the frequency parameter wc1 is twice the highest resonant frequency wr_max.

$$wc1 = 2 \times \sqrt{K1\left(\frac{1}{J1 \cdot g\_min^2} + \frac{1}{J2}\right)} \quad (4)$$

More specifically, as shown in the following expression (5-1), the control gain (Kp1, Ki1) is set so that the denominator polynomial of the speed control system closed-loop transfer function shown in the above expression (3) (the left side of the following expression (5-1)) is equal to the second-order characteristic polynomial obtained using the frequency parameter wc1 and two coefficients (c1, c2) (the right side of the following expression (5-1)). Thus, the control gain Kp1 is represented by the following expression (5-2), and the control gain Ki1 is represented by the following expression (5-3).

$$\frac{J1}{Ki1} \cdot s^2 + \frac{Kp}{Ki1} \cdot s + 1 = c2 \cdot \left(\frac{s}{wc1}\right)^2 + c1 \cdot \frac{s}{wc1} + 1 \quad (5\text{-}1)$$

$$Kp1 = \left(\frac{c2}{c1}\right) \cdot J1 \cdot wc1 \quad (5\text{-}2)$$

$$Ki1 = \left(\frac{1}{c1}\right) \cdot J1 \cdot wc1^2 \quad (5\text{-}3)$$

It should be noted that, in the above expressions (5-2) and (5-3), the coefficients (c1, c2) are, for example, set to values such that the imaginary part of the pole of the speed control system closed-loop transfer function shown in the above expression (3) becomes 0 and the real part thereof becomes −wc1. More specifically, c1=2 and c2=1.

Next, the setting of the control gain (Kp2, Kd2, f2, Ki2) of the output-side controller 6 will be described. First, when the transmission gear ratio g of the test piece W is defined as a value other than 0, for example as 1, and the moment of inertia J1 is further defined as infinity, the transmission function of the output-side shaft torque detection signal Tk1 with respect to the torque T2 of the output-side dynamometer 12 in the control target P is represented by the following expression (6).

$$\frac{Tk1}{T2} = \frac{K1}{J2 \cdot s^2 + K1} \qquad (6)$$

Furthermore, when combining the transfer function shown in the above expression (6) and the control circuit of the output-side controller 6, the shaft torque control system closed-loop transfer function from the output-side shaft torque command signal Tk1ref to the output-side shaft torque detection signal Tk1 is represented by the following expression (7).

$$\frac{Tk1}{Tk1ref} = \frac{K1 \cdot Ki2 \cdot (1 + f2 \cdot s)}{K1 \cdot Ki2 + K1(1 + f2 \cdot Ki2 + Kp2)s + K1(f2 + Kd2)s^2 + J2 \cdot s^3 + f2 \cdot J2 \cdot s^4} \qquad (7)$$

As shown in FIG. 3, the control gain (Kp2, Kd2, f2, Ki2) of the output-side controller 6 is set so that the imaginary part of the pole Pt of the shaft torque control system closed-loop transfer function as shown in the above expression (7) becomes substantially zero, and the real part of the pole Pt becomes a negative value and becomes smaller in the negative direction than the real part of the pole Ps of the speed control system closed-loop transfer function. More specifically, when the real part of the pole Pt of the shaft torque control system closed-loop transfer function is defined as −wc2, the real part −wc2 of the pole is set to become a negative value and to become smaller in the negative direction than the value obtained by multiplying the resonant frequency wr by a negative sign, and more preferably, set to become a negative value and to become smaller in the negative direction than the value obtained by multiplying the lowest resonant frequency wr_min by a negative sign. In the following, as shown in the following expression (8), a case in which the control gain (Kp2, Kd2, f2, Ki2) is set so that the frequency parameter wc2 becomes half the lowest resonant frequency wr_min will be described.

$$wc2 = \frac{1}{2} \times \sqrt{K1\left(\frac{1}{J1 \cdot g\_max^2} + \frac{1}{J2}\right)} \qquad (8)$$

More specifically, as shown in the following expression (9-1), the control gain (Kp2, Kd2, f2, Ki2) is set so that the denominator polynomial of the shaft torque control system closed-loop transfer function shown in the above expression (7) (the left side of the following expression (9-1)) becomes equal to the fourth-order characteristic polynomial obtained using the frequency parameter wc2 and four coefficients (p1, p2, p3, p4) (the right side of the following expression (9-1)). Thus, the control gain Kp2 is represented by the following expression (9-2), the control gain Kd2 is represented by the following expression (9-3), the control gain f2 is represented by the following expression (9-4), and the control gain Ki2 is represented by the following expression (9-5).

$$1 + \frac{(1 + f2 \cdot Ki2 + Kp2)s}{Ki2} + \frac{(f2 + Kd2)s^2}{Ki2} + \frac{J2s^3}{K1 \cdot Ki2} + \frac{f2 \cdot J2s^4}{K1 \cdot Ki2} = \qquad (9-1)$$

$$1 + p1 \cdot \left(\frac{s}{wc2}\right) + p2 \cdot \left(\frac{s}{wc2}\right)^2 + p3 \cdot \left(\frac{s}{wc2}\right)^3 + p4 \cdot \left(\frac{s}{wc2}\right)^4$$

$$Kp2 = \frac{-K1 \cdot p3^2 + J2 \cdot p1 \cdot p3 \cdot wc2^2 - J2 \cdot p4 \cdot wc2^2}{K1 \cdot p3^2} \qquad (9-2)$$

$$Kp2 = \frac{-K1 \cdot p4 + J2 \cdot p2 \cdot wc2^2}{K1 \cdot p3 \cdot wc2} \qquad (9-3)$$

$$f2 = \frac{p4}{p3 \cdot wc2} \qquad (9-4)$$

$$Ki2 = \frac{J2 \cdot wc2^3}{K1 \cdot p3} \qquad (9-5)$$

In the above expressions (9-2) to (9-5), the coefficients (p1, p2, p3, p4), for example, are set such that the imaginary part of the pole of the shaft torque control system closed-loop transfer function shown in the above expression (7) becomes 0 and the real part thereof becomes −wc2. More specifically, p1=4, p2=6, p3=4, and p4=1.

Next, the advantageous effects of the testing system S including the input-side controller 5 and the output-side controller 6 in which the control gain is set as described above will be described with reference to FIGS. 4 to 7.

Figure 4:
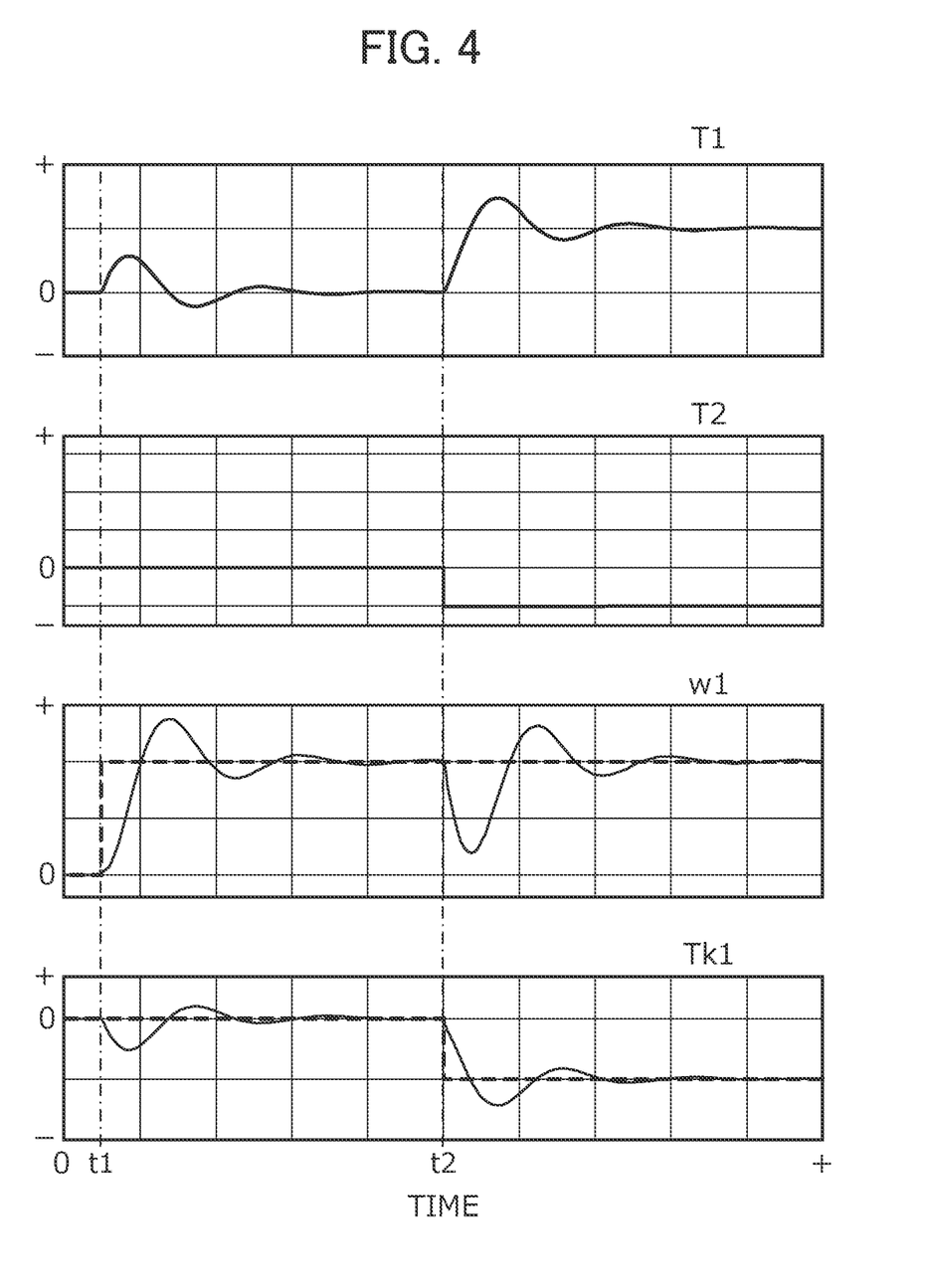
FIG. 4 is a time chart showing an example of control by a conventional testing system when g=g_min.
Figure 5:
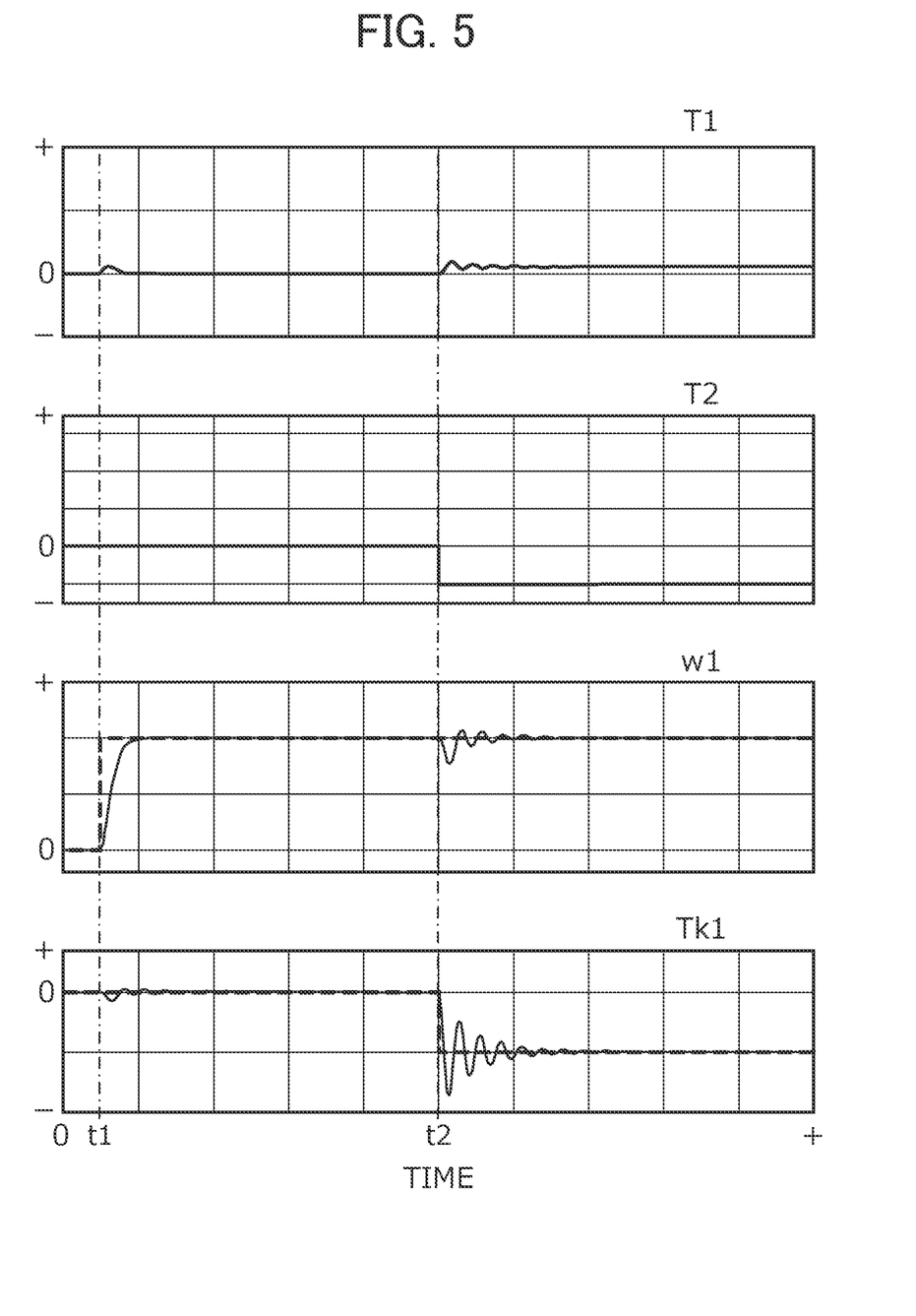
FIG. 5 is a time chart showing an example of control by a conventional testing system when g=g_max.
Figure 6:
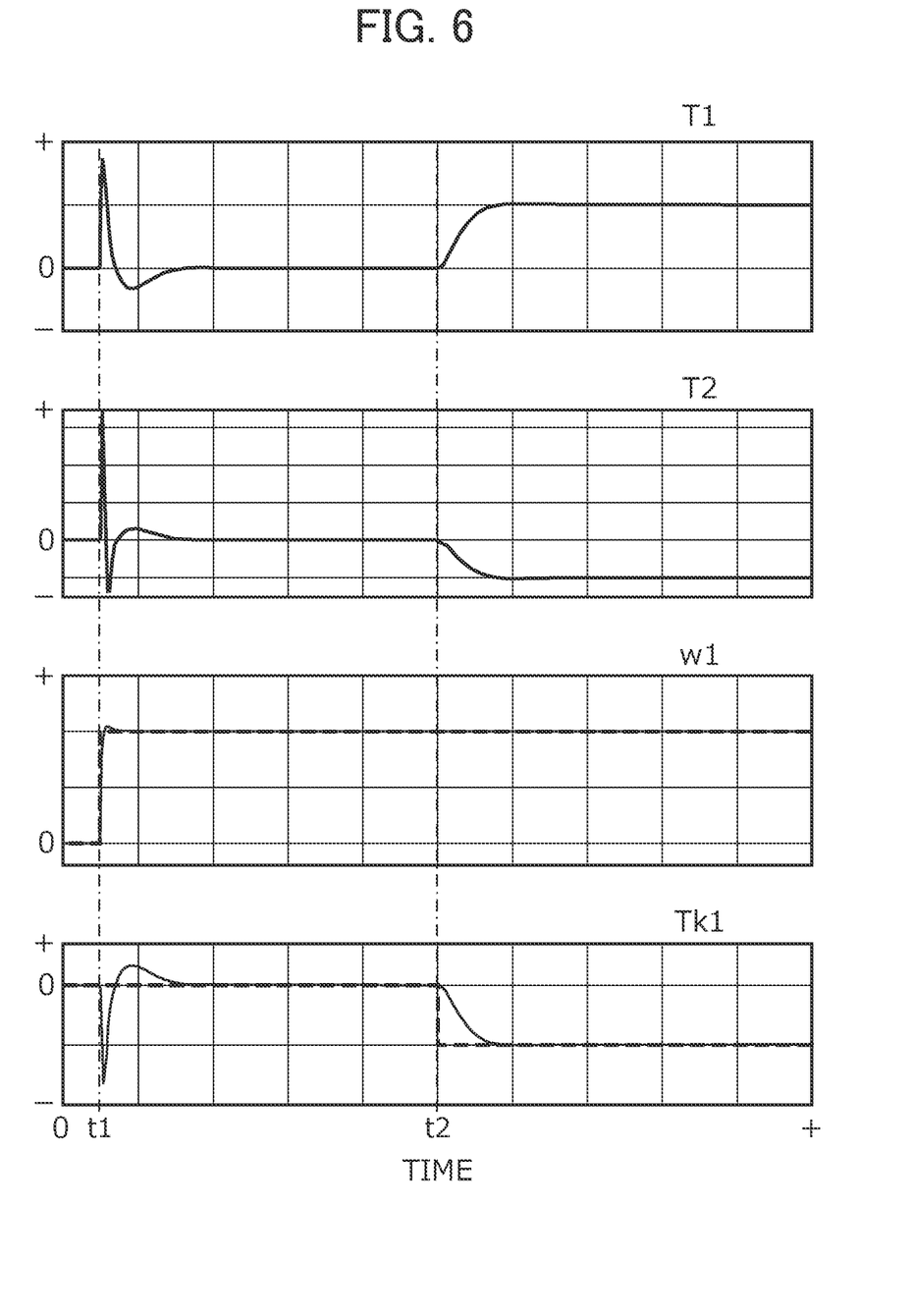
FIG. 6 is a time chart showing an example of control by the testing system of the present embodiment when g=g_min.
Figure 7:
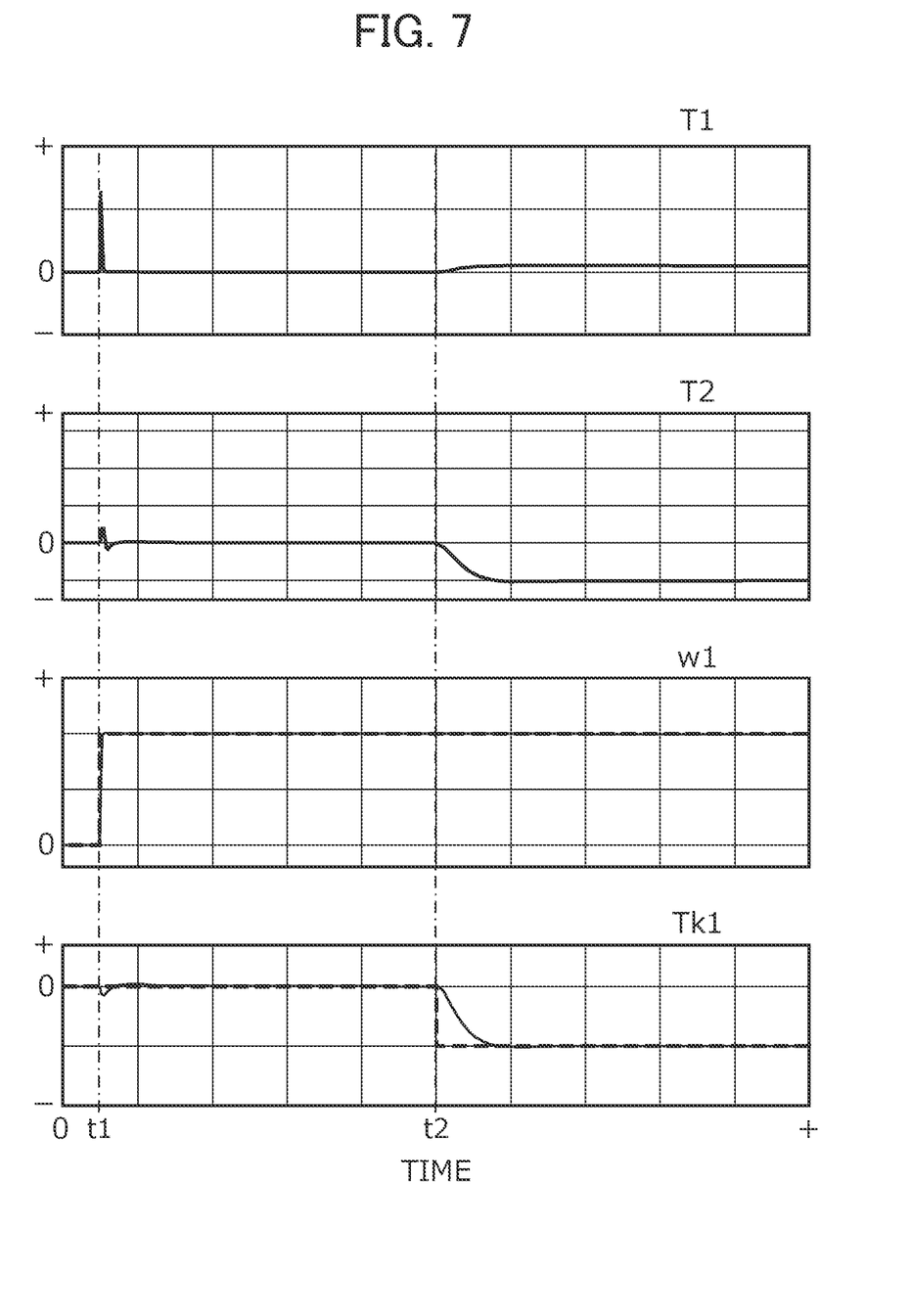
FIG. 7 is a time chart showing an example of control by the testing system of the present embodiment when g=g_max.

FIGS. 4 and 5 are time charts, each showing a control example by a conventional testing system, and FIGS. 6 and 7 are time charts, each showing a control example by the testing system S according to the present embodiment. More specifically, FIGS. 4 and 6 each show a control example when the transmission gear ratio g of the test piece W is set to the lowest transmission gear ratio g_min, and FIGS. 5 and 7 each show a control example when the transmission gear ratio g of the test piece W is set to the highest transmission gear ratio g_max.

Here, the conventional testing system refers to a system in which the speed control is performed for the input shaft WI under a lower control response (i.e., the abovementioned frequency parameter wc1) than the lowest resonant frequency wr_min, and the shaft torque control is performed for the output shaft WO without feeding back the output-side shaft torque detection signal Tk1. In other words, the conventional testing system refers to a system of the output-side shaft torque command signal Tk1ref=the output-side torque current command signal T2.

Furthermore, in FIGS. 4 to 7, the top time chart shows the change over time of the input-side torque current command signal T1, the second time chart from the top shows the change over time of the output-side torque current command signal T2, the third time chart from the top shows the input-side angular velocity detection signal w1 (solid line) and the input-side angular velocity command signal w1ref (broken line), and the bottom time chart shows the output-side shaft torque detection signal Tk1 (solid line) and the output-side shaft torque command signal Tk1ref (broken line). Furthermore, FIGS. 4 to 7 each show a case in which the input-side angular velocity command signal w1ref is changed in a stepwise manner at time t1, and then the output-side shaft torque command signal Tk1ref is changed in a stepwise manner at time t2.

As shown in FIG. 4, in the conventional testing system, the speed control response on the input shaft WI side is set to be lower than the lowest resonant frequency wr_min. Therefore, when the input-side angular velocity command signal w1ref or the output-side shaft torque command signal Tk1ref is changed while the transmission gear ratio g is set to the lowest transmission gear ratio g_min, the input-side angular velocity detection signal w1 and the output-side shaft torque detection signal Tk1 show oscillatory responses, and it takes time for the input-side angular velocity detection signal w1 and the output-side shaft torque detection signal Tk1 to converge to the respective command values.

As shown in FIG. 5, when the input-side angular velocity command signal w1ref or the output-side shaft torque command signal Tk1ref changes while the transmission gear ratio g is set to the highest transmission gear ratio g_max, the input-side angular velocity detection signal w1 and the output-side shaft torque detection signal Tk1 show oscillatory responses. As is apparent from the comparison between FIGS. 4 and 5, when the transmission gear ratio g is changed, the time required for the input-side angular velocity detection signal w1 and the output-side shaft torque detection signal Tk1 to converge to the respective command values is varied, that is, the control response varies.

As shown in FIGS. 6 and 7, the testing system S of the present embodiment is set so that the frequency parameter wc1 is set higher than the highest resonant frequency wr_max (refer to the above expression (4)), and the speed control response of the input shaft WI becomes faster than that of the conventional testing system. Therefore, as is apparent from the comparison between FIGS. 6 and 7 and FIGS. 4 and 5, according to the testing system S of the present embodiment, it is possible to reduce or prevent the oscillatory responses of the input-side angular velocity detection signal w1 and the output-side shaft torque detection signal Tk1 when changing the input-side angular velocity command signal w1ref and the output-side shaft torque command signal Tk1ref, and to quickly cause them to converge to the respective command values.

Furthermore, as is apparent from the comparison between FIGS. 6 and 7, according to the testing system S of the present embodiment, even when the transmission gear ratio g is changed, the time taken for the input-side angular velocity detection signal w1 and the output-side shaft torque detection signal Tk1 to be converged to the respective command values is hardly varied, that is, the control response does not vary.

According to the testing system S of the present embodiment, the following advantageous effects are obtained.

(1) The input-side controller 5 controls the input-side dynamometer 11 coupled to the input shaft WI of the test piece W so that the deviation between the input-side angular velocity command signal w1ref and the input-side angular velocity detection signal w1 is eliminated, and the output-side controller 6 controls the output-side dynamometer 12 coupled to the output shaft WO of the test piece W so that the deviation is eliminated between the output-side shaft torque command signal Tk1ref and the output-side shaft torque detection signal Tk1. Furthermore, in the testing system S, the control gain of the input-side controller 5 (Kp1, Ki1) is set such that the real part of the pole Ps of the speed control system closed-loop transfer function becomes larger in the negative direction than the value obtained by multiplying the resonant frequency wr of the control target P by a negative sign. In other words, the control gain (Kp1, Ki1) of the input-side controller 5 is set such that the control response of the input shaft WI that performs speed control becomes higher than the resonant frequency wr. Thus, it is possible to increase the apparent inertia of the input shaft WI viewed from the output shaft WO that performs shaft torque control. Furthermore, in the testing system S, the control gain of the output-side controller 6 (Kp2, Kd2, f2, Ki2) is set such that the real part of the pole Pt of the shaft torque control system closed-loop transfer function becomes smaller in the negative direction than the real part of the pole Ps of the speed control system closed-loop transfer function. In other words, the control gain (Kp2, Kd2, f2, Ki2) of the output-side controller 6 is set such that the control response of the output shaft WO of the shaft torque control side becomes lower than the control response of the input shaft WI of the speed control side. Thus, it is possible for the output-side controller 6 to perform torque feedback control which is robust to changes in the resonant frequency wr of the control target P. Thus, even when the resonant frequency wr is changed with the change in the transmission gear ratio g of the test piece W, it is possible to perform the speed control on the input shaft WI and the shaft torque control on the output shaft WO without greatly changing the control response.

(2) In the testing system S, the control gain of the output-side controller 6 (Kp2, Kd2, f2, Ki2) is set such that the real part of the pole Pt of the shaft torque control system closed-loop transfer function becomes smaller in the negative direction than the value obtained by multiplying the resonant frequency wr of the control target P by a negative sign. Thus, it is possible to further improve the robustness of the shaft torque control by the output-side controller 6, and hence, it is possible to further reduce or prevent a change in the control response with changes in the resonant frequency wr of the control target P.

(3) In the testing system S, the control gain (Kp1, Ki1) of the input-side controller 5 is set such that the real part of the pole Ps of the speed control system closed-loop transfer function becomes larger in the negative direction than the value obtained by multiplying the highest resonant frequency wr_max by a negative sign. Thus, it is possible to increase the apparent inertia of the input shaft WI of the speed control side viewed from the output shaft WO on the shaft torque control side. Furthermore, in the testing system S, the control gain (Kp2, Kd2, f2, Ki2) of the output-side controller 6 is set so that the real part of the pole Pt of the shaft torque control system closed-loop transfer function becomes smaller in the negative direction than the value obtained by multiplying the lowest resonant frequency wr_min by a negative sign. Thus, it is possible to further improve the robustness of the shaft torque control by the output-side controller 6, and hence, it is possible to further reduce or prevent a change in the control response with changes in the resonant frequency wr of the control target P.

(4) As described with reference to FIGS. 4 and 5, in a conventional testing system, varying the input-side angular velocity command signal w1ref or the output-side shaft torque command signal Tk1ref may cause the input-side angular velocity detection signal w1 or the output-side shaft torque detection signal Tk1 to exhibit oscillatory behavior. In contrast, in the testing system S, the control gain of the input-side controller 5 (Kp1, Ki1) is set such that the imaginary part of the pole of the speed control system closed-loop transfer function becomes zero, and the control gain of the output-side controller 6 (Kp2, Kd2, f2, Ki2) is set such that the imaginary part of the pole Pt of the shaft torque control system closed-loop transfer function becomes zero. Thus, it is possible to reduce or prevent oscillatory behavior of the input-side angular velocity detection signal w1 and the output-side shaft torque detection signal Tk1.

Although an exemplary embodiment of the present invention has been explained above, the present invention is not limited thereto. The configuration of detailed parts may be modified as appropriate within the scope of the gist of the present invention.

In the above embodiment, the input-side controller 5 performs the speed control for the input shaft WI, and the output-side controller 6 performs the shaft torque control for the output shaft WO. However, the present invention is not limited thereto. As described above, the input-side controller may perform the shaft torque control for the input shaft WI, and the output-side controller may perform the speed control for the output shaft WO. In this case, the control gain of the output-side controller that performs the speed control is preferably set such that the real part of the pole of the speed control system closed-loop transfer function from the speed command signal to the speed detection signal becomes greater in the negative direction than the value obtained by multiplying the resonant frequency wr of the control target P (more preferably, the highest resonant frequency wr_max) by a negative sign. Furthermore, the control gain of the input-side controller that performs the shaft torque control is preferably set such that the real part of the pole of the shaft torque control system closed-loop transfer function from the shaft torque command signal to the shaft torque detection signal becomes smaller in the negative direction than the real part of the pole of the speed control system closed-loop transfer function. More preferably, the control gain of the input-side controller is preferably set such that the real part of the pole of the shaft torque control system closed-loop transfer function becomes smaller in the negative direction than the value obtained by multiplying the resonant frequency wr of the control target (more preferably, the lowest resonant frequency wr_min) by a negative sign. Furthermore, in this case, the control gain of the input-side controller is preferably set such that the imaginary part of the pole of the speed control system closed-loop transfer function becomes 0, and the imaginary part of the pole of the shaft torque control system closed-loop transfer function becomes 0.

EXPLANATION OF REFERENCE NUMERALS

S testing system
W test piece
Wi input shaft
Wo output shaft
11 input-side dynamometer (dynamometer)
12 output-side dynamometer (dynamometer)
31 input-side angular velocity sensor (speed detector)
32 output-side angular velocity sensor (speed detector)
41 input-side shaft torque sensor (shaft torque detector)
42 output-side shaft torque sensor (shaft torque detector)
5 input-side controller (speed controller)
6 output-side controller (torque controller)
w1 input-side angular velocity detection signal (speed detection signal)
w1ref input-side angular velocity command signal (speed command signal)
Tk1 output-side shaft torque detection signal (torque detection signal)
Tk1ref output-side shaft torque command signal (torque command signal)
Kp1, Ki1 control gain (control gain of a speed controller)
Kp2, Kd2, f2, Ki2 control gain (control gain of a torque controller)
wr resonant frequency
wr_min lowest resonant frequency (lowest frequency)
wr_max highest resonant frequency (highest frequency)

The invention claimed is:

1. A testing system comprising:
dynamometers which are respectively coupled to an input shaft and an output shaft of a test piece which can change a transmission gear ratio between input and output;
a speed detector that generates a speed detection signal corresponding to a shaft speed of either one of the input shaft and the output shaft;
a torque detector that generates a torque detection signal corresponding to a shaft torque of one other of the input shaft and the output shaft;
a speed controller that controls the dynamometer coupled to the one of the input shaft and the output shaft such that a deviation between a speed command signal corresponding to a command for the speed, and the speed detection signal is eliminated; and
a torque controller that controls the dynamometer coupled to the other one of the input shaft and the output shaft such that a deviation between a torque command signal corresponding to a command for the torque, and the torque detection signal is eliminated,
wherein a control gain of the speed controller is set such that a real part of a pole of a speed control system closed-loop transfer function from the speed command signal to the speed detection signal becomes larger in a negative direction than a value obtained by multiplying a resonant frequency of a control target including the test piece by a negative sign, and
a control gain of the torque controller is set such that a real part of a pole of a torque control system closed-loop transfer function from the torque command signal to the torque detection signal becomes smaller in the negative direction than the real part of the pole of the speed control system closed-loop transfer function.

2. The testing system according to claim 1, wherein the control gain of the torque controller is set such that the real part of the pole of the torque control system closed-loop transfer function becomes smaller in the negative direction than the value obtained by multiplying the resonant frequency of the control target by a negative sign.

3. The testing system according to claim 1, wherein
the resonant frequency of the control target varies between a lowest frequency and a highest frequency by the transmission gear ratio varying,
the control gain of the speed controller is set such that the real part of the pole of the speed control system closed-loop transfer function becomes larger in the negative direction than a value obtained by multiplying the highest frequency by a negative sign, and
the control gain of the torque controller is set such that the real part of the pole of the torque control system closed-loop transfer function becomes smaller in the negative direction than a value obtained by multiplying the lowest frequency by a negative sign.

4. The testing system according to claim 1, wherein
the control gain of the speed controller is set such that an imaginary part of the pole of the speed control system closed-loop transfer function becomes zero, and
the control gain of the torque controller is set such that an imaginary part of the pole of the torque control system closed-loop transfer function becomes zero.

5. The testing system according to claim 2, wherein
the resonant frequency of the control target varies between a lowest frequency and a highest frequency by the transmission gear ratio varying,
the control gain of the speed controller is set such that the real part of the pole of the speed control system closed-loop transfer function becomes larger in the negative direction than a value obtained by multiplying the highest frequency by a negative sign, and the control gain of the torque controller is set such that the real part of the pole of the torque control system closed-loop transfer function becomes smaller in the negative direction than a value obtained by multiplying the lowest frequency by a negative sign.

6. The testing system according to claim 2, wherein the control gain of the speed controller is set such that an imaginary part of the pole of the speed control system closed-loop transfer function becomes zero, and the control gain of the torque controller is set such that an imaginary part of the pole of the torque control system closed-loop transfer function becomes zero.

7. The testing system according to claim 3, wherein the control gain of the speed controller is set such that an imaginary part of the pole of the speed control system closed-loop transfer function becomes zero, and the control gain of the torque controller is set such that an imaginary part of the pole of the torque control system closed-loop transfer function becomes zero.

8. The testing system according to claim 5, wherein the control gain of the speed controller is set such that an imaginary part of the pole of the speed control system closed-loop transfer function becomes zero, and the control gain of the torque controller is set such that an imaginary part of the pole of the torque control system closed-loop transfer function becomes zero.

* * * * *